United States Patent

Niegel et al.

[11] Patent Number: 6,095,690
[45] Date of Patent: Aug. 1, 2000

[54] SLIDING BEARING ELEMENT WITH LUBRICATING OIL POCKETS

[75] Inventors: Fritz Niegel, Oestrich-Winkel; Peter-Clemens Hoppe-Boeken, Bad Rappenau-Babstadt; Eckhart Schopf, Wiesbaden, all of Germany

[73] Assignee: Glyco-Metall-Werke Glyco B.V. & Co. KG, Weisbaden, Germany

[21] Appl. No.: 09/101,976

[22] PCT Filed: Jan. 28, 1997

[86] PCT No.: PCT/DE97/00194

§ 371 Date: Jul. 30, 1998

§ 102(e) Date: Jul. 30, 1998

[87] PCT Pub. No.: WO97/28379

PCT Pub. Date: Aug. 7, 1997

[30] Foreign Application Priority Data

Jan. 30, 1996 [DE] Germany .......................... 196 03 170
Jan. 8, 1997 [DE] Germany .......................... 197 00 339

[51] Int. Cl.$^7$ .................................................. F16C 33/10
[52] U.S. Cl. ................................... 384/293; 384/288
[58] Field of Search .................................. 384/293, 282, 384/283, 284, 285, 286, 287, 288, 289, 290, 291, 292, 294

[56] References Cited

U.S. PATENT DOCUMENTS

| | | | |
|---|---|---|---|
| 1,882,956 | 10/1932 | Sandler | 384/293 |
| 3,909,087 | 9/1975 | Cairns | 384/293 |
| 3,976,342 | 8/1976 | Leyendecker et al. | 384/293 |
| 5,000,584 | 3/1991 | Simmons | 384/291 X |
| 5,238,311 | 8/1993 | Katou et al. | 384/288 |
| 5,462,362 | 10/1995 | Yuhta et al. | 384/293 X |
| 5,516,213 | 5/1996 | Moriyama et al. | 384/292 |

FOREIGN PATENT DOCUMENTS

| | | |
|---|---|---|
| 104159 | 3/1984 | European Pat. Off. . |
| 834480 | 7/1949 | Germany . |
| 7817118 | 9/1978 | Germany . |
| 3326316 | 2/1985 | Germany . |
| 4125165 | 2/1993 | Germany . |

Primary Examiner—Thomas R. Hannon
Attorney, Agent, or Firm—Reising, Ethington, Barnes, Kisselle, Learman & McCulloch, P.C.

[57] ABSTRACT

Plain bearing elements comprise at least one single-layer metallic bearing material (4) having a sliding surface (6) with lubricating oil pockets (10). The depth (T) of the open oil pockets (10) is 0.03 mm to 0.3 mm, and the ratio of the pocket area to the pocket depth is 10 to 40 mm. The plain bearing elements exhibit superior running qualities and properties. The depth of the oil pockets (10) may be adapted to the service viscosity of the lubricating oil. The oil pockets (10) in the same plain bearing element may also have varying depths (T) and be provided only in predetermined regions of the plain bearing element.

23 Claims, 7 Drawing Sheets

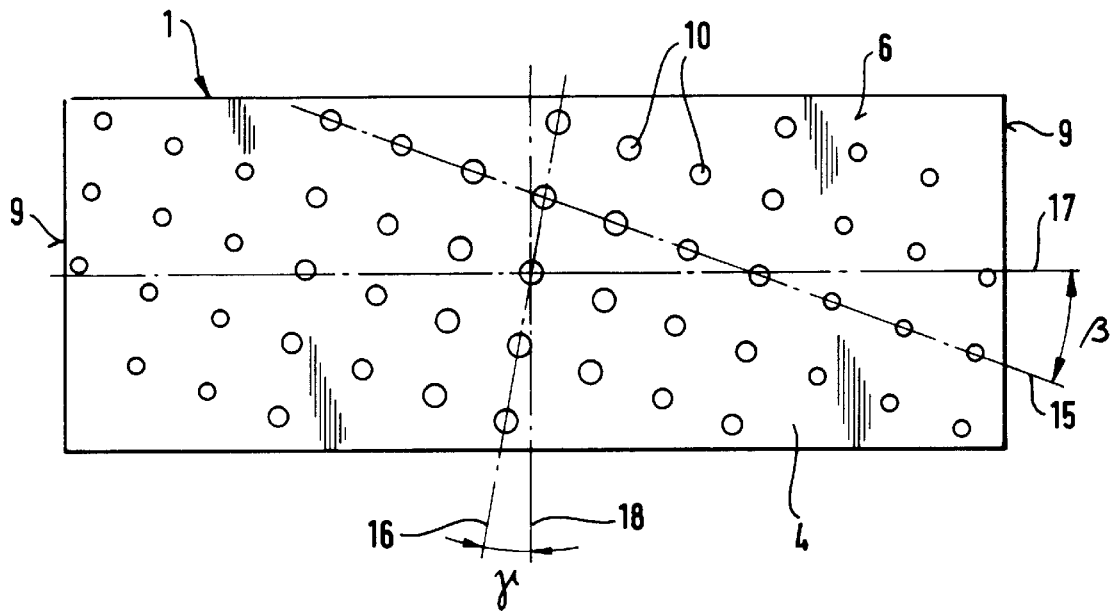
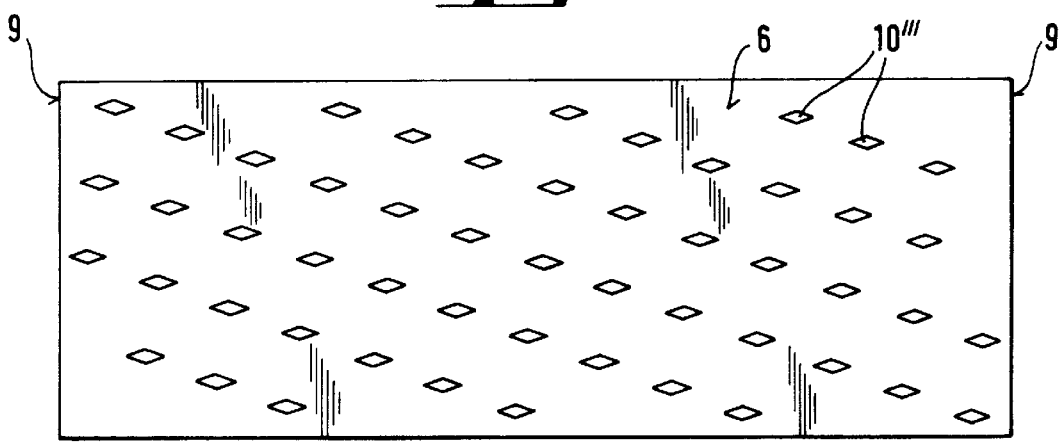

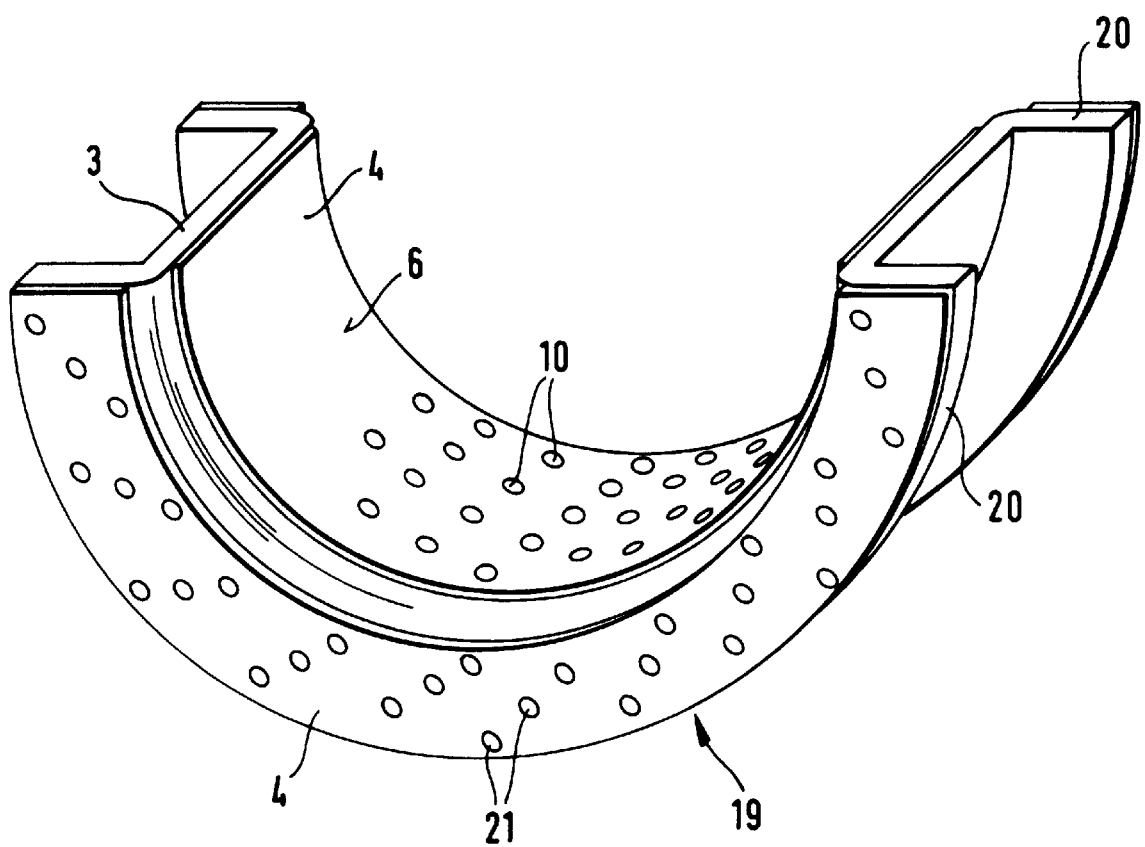

inadequate lubrication steel / bronze / electroplated layer sliding performance steel with wear resistant Al-alloy

SLIDING BEARING ELEMENT WITH LUBRICATING OIL POCKETS

BACKGROUND OF THE INVENTION

1. Field of the Invention

The invention relates to a plain bearing element comprising a single-layer or multilayer metallic bearing material, pockets for lubricating oil being provided in the sliding surface. The term "plain bearing elements" is intended to mean, among others, plain bearing half-liners, flanged bearings, bushes and thrust washers, comprising a single-layer or multilayer metallic bearing material which may be deposited on a backing material.

2. Description of Related Art

Provision of depressions on the sliding surface has been known for years. It is suggested in DE-PS 546 781 to make, for the avoidance of "contact oxidation", in one of the contacting surfaces of a bearing discontinuities, depressions, roughenings and similar means. In this connection also circular depressions were shown but it is not stated how these depressions are dimensioned, arranged or lined.

DE-PS 834 480 describes a bearing in which the bearing surface is composed of a plurality of small areas of hard and soft bearing material. Apart from groove-shaped depressions also square-shaped recesses are provided which are, however, completely filled with a soft bearing material. The depressions are made by means of an embossing roll rotating in a metallic bath.

From DE-OS 27 11 983 is known a bearing which has, in addition to oil grooves, also hemispherical oil recesses of a diameter of 1.5 to 2.5 mm which are arranged with a spacing of 4 mm in circumferential direction or 4.8 mm in axial direction. Because the thickness of the bearing alloy is only 0.25 mm these oil recesses extend up to the steel backing. The lubricating oil pockets of these dimensions have, among others, the disadvantage that the bonding region of the bearing alloy with the steel backing is exposed so that delaminations may occur in this region.

From DE 33 26 316 C2 are known bearing bushes of sintered metal with lubricating oil pockets arranged on the inner sliding surface, the pockets being hemispherical or ellipsoidal. The depth of the oil pockets is 0.2 to 1 mm while 10 to 30% of the entire sliding surface is occupied by the oil pockets.

AU 143 992 shows a sliding surface design with embossed recesses which are entirely filled with a soft plain bearing material.

DE-GM 7817118 describes self-lubricating bearing which has for the embedding of a solid lubricant cavities of circular or spherical shape.

From U.S. Pat. No. 5,462,362 is known a sliding element used for extremely low sliding velocities such as spherical elements in artificial joints. The sliding surface has cylindrical recesses whose diameter is 0.2 to 0.8 mm and depth is 1 to 10 $\mu$m. The recesses are also filled with a solid lubricant.

These known bearing elements may be used, depending on the bearing material, only for low sliding velocities of up to about 5 m/s and average loading of up to about 30 MPa. The bearing elements are not suitable for use as big-end bearings and main bearings in internal-combustion engines because due to the relatively large depth and/or the large area occupied by the oil pockets the build up of the hydrodynamic pressure needed for these applications is not possible to a sufficient degree.

Also known are bearing elements according to EP-PS 104159 and U.S. Pat. No. 5,238,311 which have groove-shaped recesses in the sliding surface whose depth is 3 to 6 $\mu$m. These elements have the disadvantage that when the grooves are subjected to the loadings of over 30 MPa which is common in big-end bearings and main bearings of internal-combustion engines, they are either plastically deformed or worn which may lead to seizure so that they may no longer perform their task.

The groove bearings described in EP-PS 57808 which comprise grooves filled with soft bearing materials have, in practice, the disadvantage that after a certain time of operation the soft bearing material if flushed out by the lubricating oil and the bearing is no longer able to function.

SUMMARY OF THE INVENTION

It is therefore the aim of the invention to improve sliding elements with lubricating oil pockets to such an extent that their running qualities are better than those of known plain bearing elements with oil pockets and that their properties are superior to those of both the bearings with open and with filled grooves and the bearings without oil pockets.

A large number of experiments with lubricating oil pockets of various shapes known from the state of the art, brought no significant improvement of performance in service, so that no advantage could be expected from the selection of dimensions. Because oil pockets generally reduce the proportion of supporting surfaces, oil pockets must consequently be considered as disadvantageous.

It was therefore that much more surprising to find that plain bearing elements whose oil pockets have a small depth of 0.03 mm to 0.3 mm and in which the ratio of the pocket area to the pocket depth is 10–40 mm exhibit an outstanding performance in service, for instance in service conditions common for big-end bearings and main bearings of internal-combustion engines when using conventional lubricants such as engine oils according to SAE. The lubricating oil pockets become completely filled with lubricant only when these dimensions are observed, so that, in operation, a hydrodynamic pressure may obviously be built up with respect to the element in sliding contact in connection with the closely delimited pocket which is closed on all sides except in the sliding surface, this pressure being the same as that at the smooth sliding surface and consequently contribution to the share in supporting is surprisingly made.

In any case the pocket depth must be smaller than the thickness of the layer of bearing material in which the oil pockets are made.

This dimensioning of the oil pockets applies preferably for bearing elements where the diameter of the bearing is 35 to 160 mm. The depth of the oil pockets is preferably of the order of the clearance between the elements in sliding contact.

The loading is taken up not only by the supporting surfaces between the oil pockets but also by the lubricant in the oil pockets, so that the oil pockets do not serve only for the supply of lubricant as in the state of the art. As a consequence sliding velocities greater than 20 m/s and loading of over 50 MPa may be used for aluminium alloys and more than 70 MPa for bronzes with electroplated layers may be used without any problem. Also antiseizure properties are improved, because even when the supporting surfaces are running dry the lubricant in the pockets contributes to hydrodynamic support. Further, even frictional losses are significantly reduced.

Also in comparison with bearings with open grooves not filled with soft bearing material (U.S. Pat. No. 4,538,929)

the plain bearing elements according to the invention are superior in that the lubricant in the oil pockets cannot escape in circumferential direction as in the case of grooves, but is accumulated in the oil pockets and inflow and outflow of the lubricant takes place only across the thin lubrication gap. In addition to the hydrodynamic pressure also a pressure component develops due to the diffuser action on inflow of the lubricant into the oil pocket while on the outflow a pressure component is produced by the damming-up edge.

The properties of the plain bearing elements may be further optimized when the relationship between the dimensioning of the oil pockets and the viscosity of the used lubricants is taken into consideration. The depth of oil pockets in bearings for internal-combustion engines should preferably be T=0.5 to T=$e^a$, where a=0.45·l$\eta$−3 and T is in mm, when the dynamic viscosity $\eta$ of the lubricant at service temperature is given in mPas. The equation applies to operational viscosities of $\eta$=1.8 mPas to 50 mPas which corresponds to the use of conventional engine oils at temperatures of about 60° to 180° (0. .R Lang, W. Steinhilper "Gleitlager", 1978, Springer-Verlag, p. 36).

The area of all the oil pockets together should preferably not exceed 10% of the whole area of the sliding surface of the plain bearing element, because otherwise the proportion of the area of the undisturbed support surfaces would be too small to withstand the high loading in modern internal-combustion engines.

All the oil pockets need not necessarily have the same depth. On the contrary, it may be advisable for special applications to select the depth of the oil pockets in the region of highest loading or smallest thicknesses of the lubricating film in order to improve the supply of lubricant, and to continually reduce the depth of the oil pockets towards the region of increasing thicknesses of the lubricating film. Particularly, in the case of big-end bearings and main bearings their areas exposed to highest loading and most endangered by wear are known, so that a tailor-made plain bearing element may be provided.

In the case of inadequate lubrication also the reverse case may be advantageous i.e the deeper oil pockets are arranged in areas which are not loaded to provide thereby an additional oil reservoir.

The oil pockets are preferably embossed in the bearing material. The machining is preferably carried out on a strip. This is much simpler than making grooves in a bearing liner that has already been formed. After the embossing of the oil pockets the strip-shaped material is subjected to forming and finally processed in the sliding surface.

So as to achieve good loadability, the bearing material in which the oil pockets are made is preferably a relatively hard alloy based on aluminium or copper. Such bearing materials can be exposed to high loads and have the advantage that they may be deposited directly onto the steel backing. Due to the relatively high tendency of such hard bearing materials to seizure, these materials could, until now, be used without additional overlay only for low sliding velocities. In order to counter the tendency to seize, experiments were made in the past to add, apart from additional coating, more tin or lead to the alloys. It was found that by the provision of oil pockets according to the invention the addition of these soft materials can be largely dispensed with. It was found further, that plain bearing elements with these bearing alloys may be used not only for higher sliding velocities but also for higher loading. On top of this also the antiseizure properties of the material could be significantly improved by the special design of the oil pockets.

According to a further embodiment, the sliding surface of the bearing material in which the pockets are made is additionally coated with an electroplated layer or a sputtered layer whose thickness is much smaller than the thickness of the oil pockets. Such a coating may be made on any bearing materials, but preferably on lead bronze.

The oil pockets are preferably not entirely filled with the electroplated layer or a sputtered layer. On the contrary, the depressions in the sliding surface are retained. Because the electroplated layer or sputtered layer form a continuous coating, a continuous coating between the supporting surfaces and the areas of the oil pockets are achieved independently of the shape of the oil pockets. Frayed portions on the margin of the oil pockets, which could be caused by the embossing of the bearing material or by the cutting of the sliding surface, are coated and evened out by the electroplated layer or sputtered layer.

The thickness of the electroplated or sputtered layer may be greater than the depth T of the oil pockets when it is ensured that the outline of the electroplated or sputtered layer follows the outline of the oil pockets made in the layer of bearing metal.

For instance the following bearing alloys may be used: AlNi2MnCu, AlZn5SiCuPbMg, AlSn6, CuPb22Sn, CuPb17Sn5, CuPb10Sn10 or CuPb22Sn3. Preferred electroplated layers consist of PbSn10Cu2, PbSn10Cu5, PbSn14Cu8 on an intermediate layer of Ni, or possibly on an intermediate layer of NiSn. A preferred sputtered layer is AlSn20.

Any shape of the oil pockets may be chosen; it has been found, however, that it is advantageous when the oil pockets have either the shape of a spherical segment or a frustum of a cone. The side-wall angle of the frustoconical oil pockets should be in the region of between 30° and 60°, preferably 45°. The inclination of the sidewalls may be used to adjust the proportion of lubricant which is forced by the movement of the elements in sliding contact from the oil pockets onto the supporting face portion. Because the advantage of the oil pockets is in that a pressure is built also in the region of the oil pockets, it was the aim at high loading to force, in operation, from the oil pockets as far as possible only small quantities of lubricating oil. If, on the other hand, the aim is to improve primarily the antiseizure properties, greater angles are preferred. Consequently smaller angles from the range of 30° to 60° are preferred for the sidewall angle $\alpha$.

According to another embodiment the oil pockets may have in top view the shape of rhombuses.

The plain bearing element is preferably a plain bearing half-liner. In this embodiment the oil pockets are arranged preferably one after another in lines transverse to the circumferential direction and the circumferential lines make with the circumferential direction any angle $\beta$, preferably between 15° and 40°. The linear arrangement corresponds approximately to the arrangement of grooves in grooved bearings, but the angle $\beta$ is greater.

The oil pockets are arranged one after another in lines which are preferably also transverse to the axial direction and the transverse lines make with the axial direction of the bearing liner any angle $\gamma$, preferably between 5° and 25°. In view of the angles $\beta$ and $\gamma$, the longitudinal lines and the transverse lines form a rhombus-shaped pattern.

It was found that this arrangement of oil pockets is more advantageous because otherwise a shadow effect is produced, which causes that not all oil pockets, particularly if arranged closely one after another, contribute to the improvement of the running qualities of the plain bearing liner and may even have a negative effect.

An arrangement of oil pockets one after another is not disadvantageous if the spacing of oil pockets which are adjacent in the direction of sliding, i.e. in the case of liners and bushes in circumferential direction, is at least 12 mm.

According to the purpose of use the oil pockets may be limited to the crown area and to a region of circumferential angles δ of the plain bearing liner or bush of ±30° to ±60° around the crown area.

Plain bearing elements according to the invention are suitable particularly for main and big-end bearings for piston engines, particularly internal combustion engines, which is not the case with conventional sliding elements with open depressions.

BRIEF DESCRIPTION OF THE DRAWINGS

Embodiments of the invention will now be described, by way of example, in greater detail with reference to the drawings, in which:

FIG. 8 is a perspective representation of a flanged bearing.

DETAILED DESCRIPTION OF THE PREFERRED EMBODIMENTS

Figure 1:
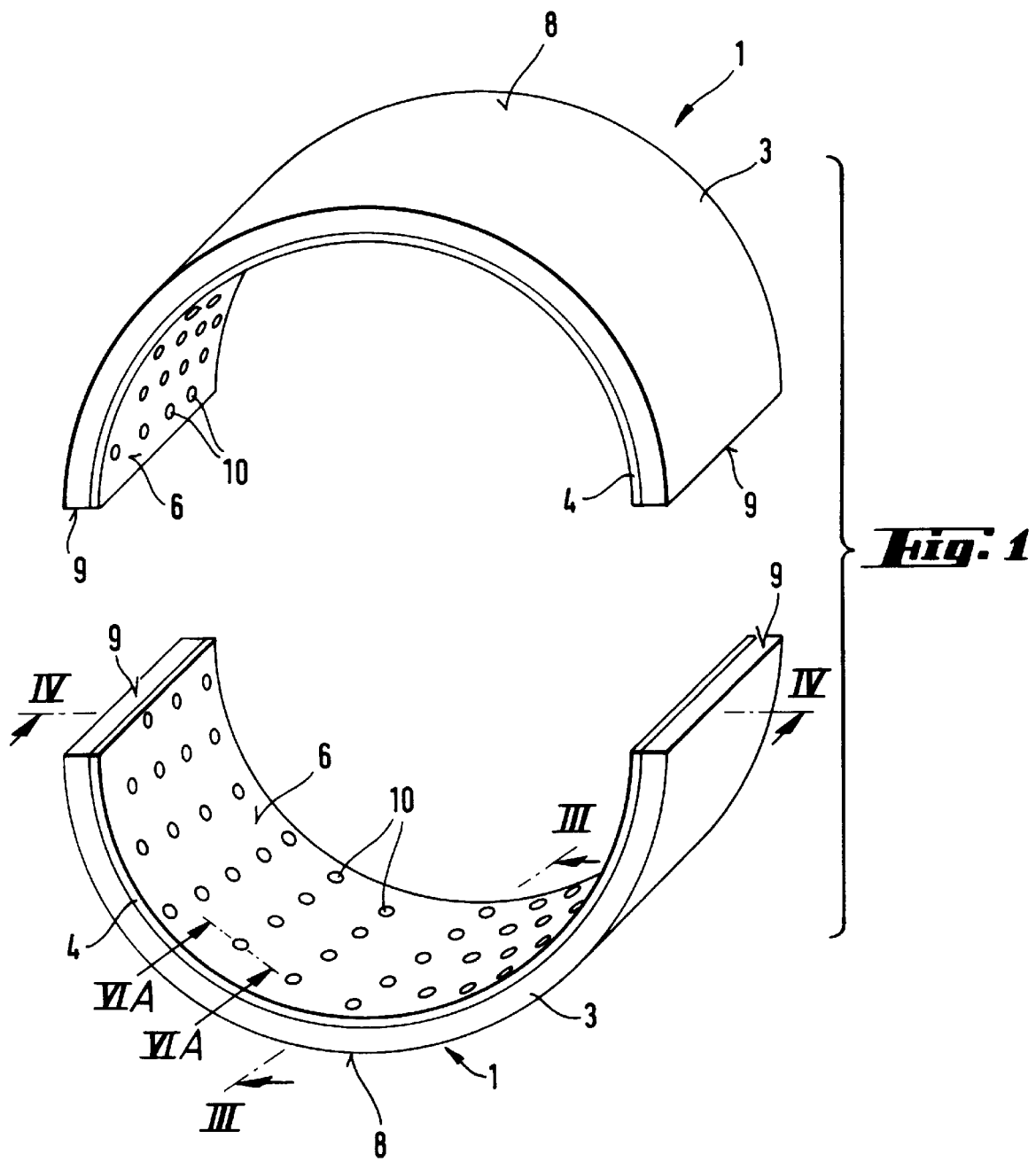
FIG. 1 is a perspective representation of plain bearing half-liners according to a first embodiment.
Figure 2:
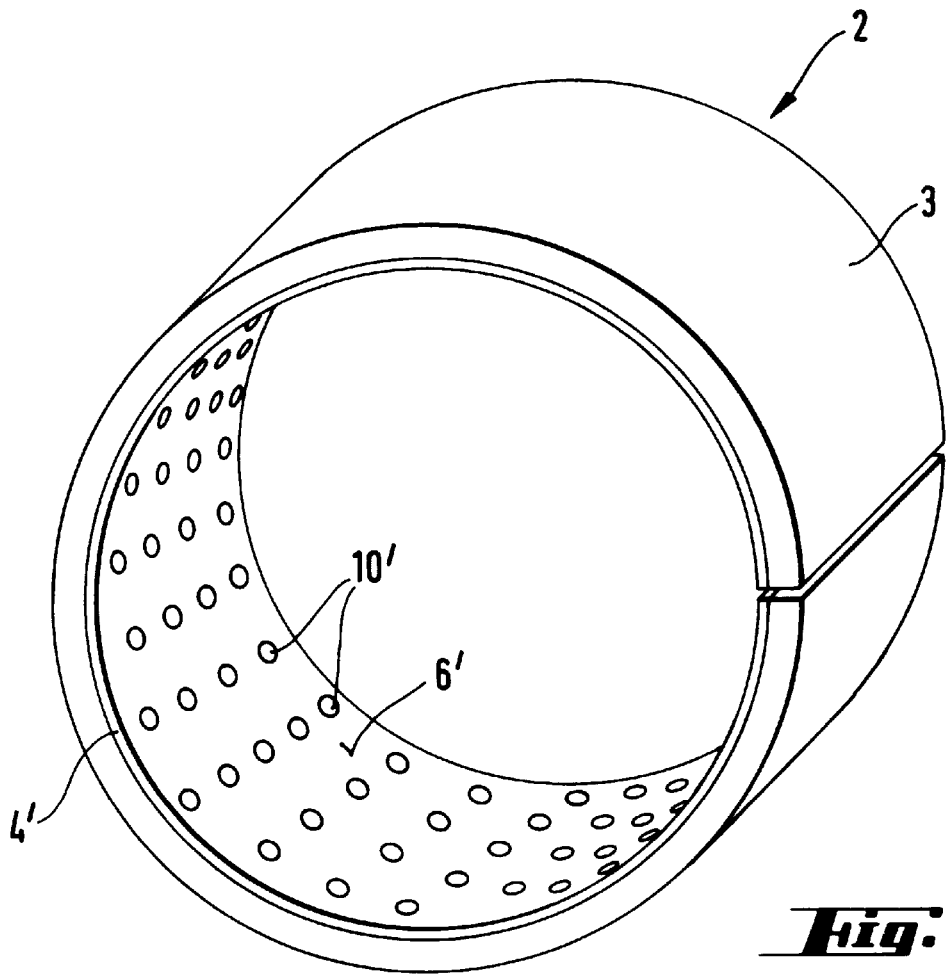
FIG. 2 is a perspective representation of a bearing bush.

In FIG. 1 are shown, in perspective representation, plain bearing half-liners 1 which bear onto each other at their parting line surfaces 9 and form, for instance, a main or big-end bearing, and in FIG. 2 is shown, in perspective representation, a bearing bush 2. On the steel backings 3 is, in both cases, deposited, for instance, an aluminium alloy 4,4'.

Into the surface of the aluminium alloy 4,4' which forms the respective sliding surface 6,6' of the plain bearing half-liner 1 or the bearing bush 2, are embossed cap-shaped depressions which form lubricating oil pockets 10, 10'. In the embodiments shown in FIGS. 1 and 2, the oil pockets 10,10' are uniformly distributed over the whole sliding surface 6,6' of the plain bearing half-liner 1 or the bearing bush 2.

Figure 3:
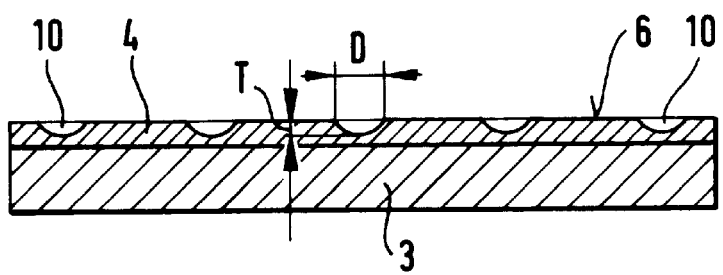
FIG. 3 is a section along line III—III in the plain bearing half-liner shown in FIG. 1, FIGS. 4A,B is a section along line IV—IV through the plain bearing half-liner shown in FIG. 1 for two different embodiments.

In FIG. 3 is shown a section along line III—III through the half-liner 1 shown in FIG. 1. As can be seen, the oil pockets 10 have the shape of a spherical segment whose diameter D is much greater than the depth T of the oil pockets 10 (see FIG. 6A) measured from the sliding surface 6. The oil pockets 10 are fully contained in the respective plain bearing material, i.e. T is smaller than the thickness of the aluminium layer 4. The diameters D of the oil pockets 10 may be in the region of about 0.5 mm to 3.5 mm and the depth T may be at the most 0.3 mm and at least 0.03 mm, while only such diameter and depth values may be combined, that the ratio of the pocket area to the pocket depth is 10 to 40 mm. In principle any geometrical shape is possible as is shown, for instance, in FIG. 7B.

The arrangement and shape of the oil pockets 10' of the bearing bush 2 corresponds to those shown in FIG. 1.

Figure 4A:
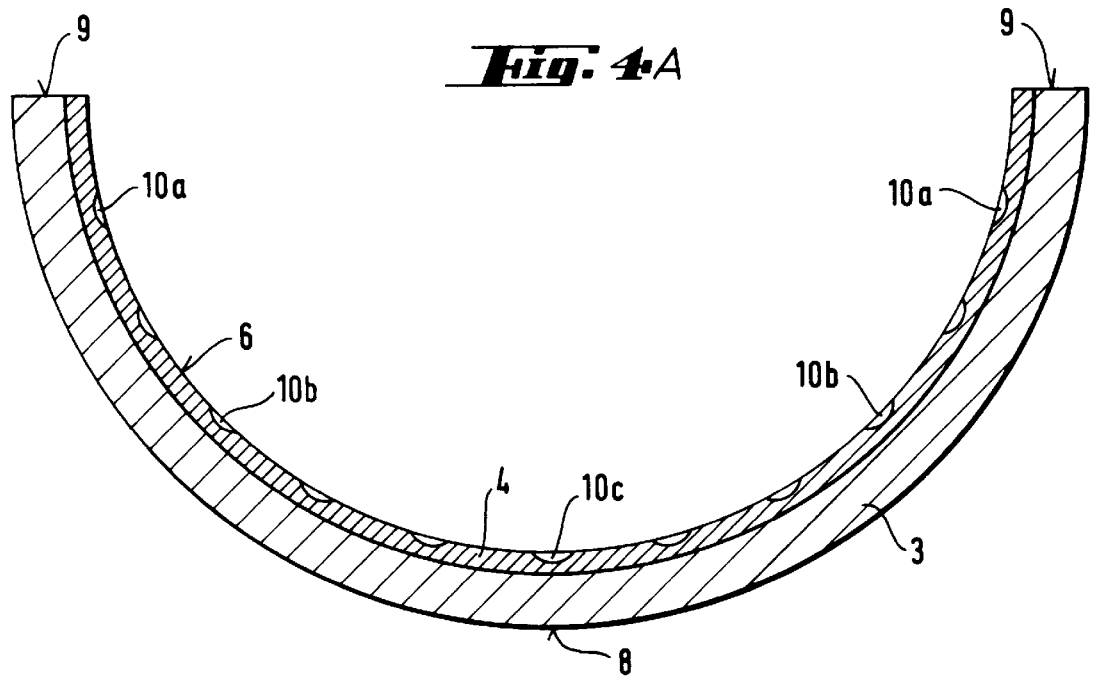
Figure 4B:
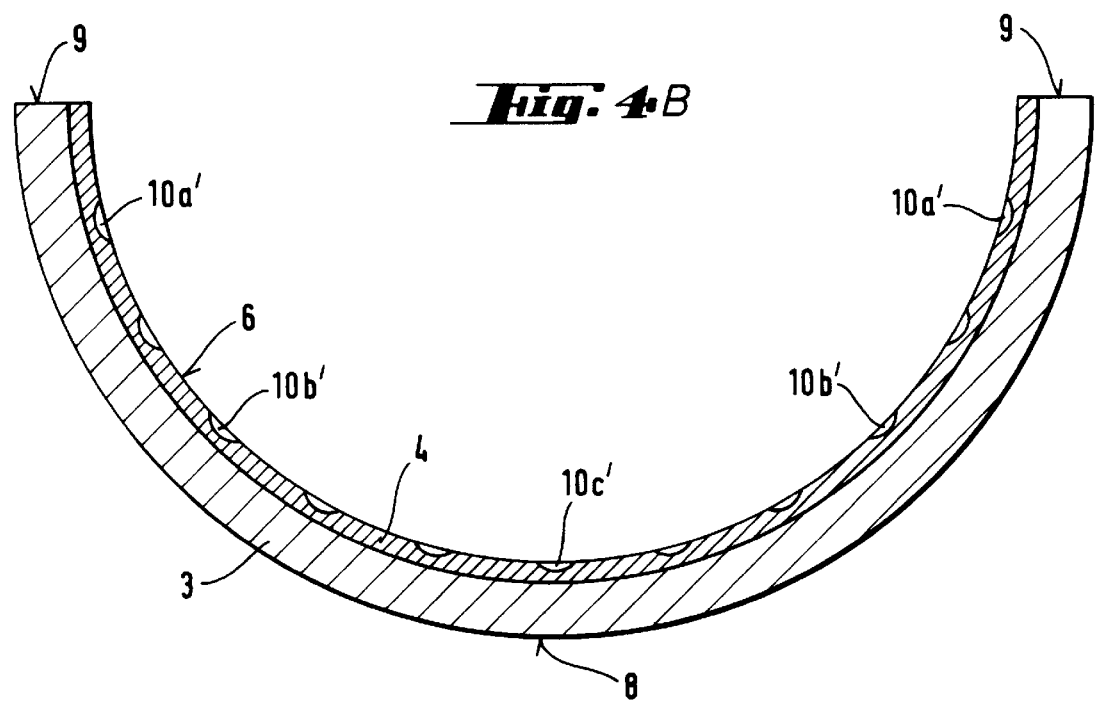

In FIGS. 4A,B is illustrated a section along line IV—IV through the plain bearing half-liner 1 shown in FIG. 1 for two embodiments. The oil pockets are of different depths; the depth in the embodiment shown in FIG. 4A is continuously decreasing from the crown area 8 to the parting line surfaces 9. The oil pockets 10a in the region of the parting line surfaces have only about half the depth of the oil pockets 10c in the region of the crown area 8 of the plain bearing half-liner 1. The oil pockets 10b in the transitional region have, on the contrary, a depth which lies approximately between that of the oil pockets 10c and the oil pockets 10a. The section IV—IV in FIG. 4B shows oil pockets 10a', 10b', 10c' whose depth is in reverse arrangement compared to FIG. 4A. As is apparent, the oil pockets 10c' in the crown area 8 have the smallest depth in the crown area 8, while the depth of the oil pockets 10b' and 10a' increases towards the parting line surfaces 9.

The arrangement and shape of the oil pockets 10a,b,c or 10a',b',c' is transferable to the bearing bush 2 shown in FIG. 2.

Figure 5:
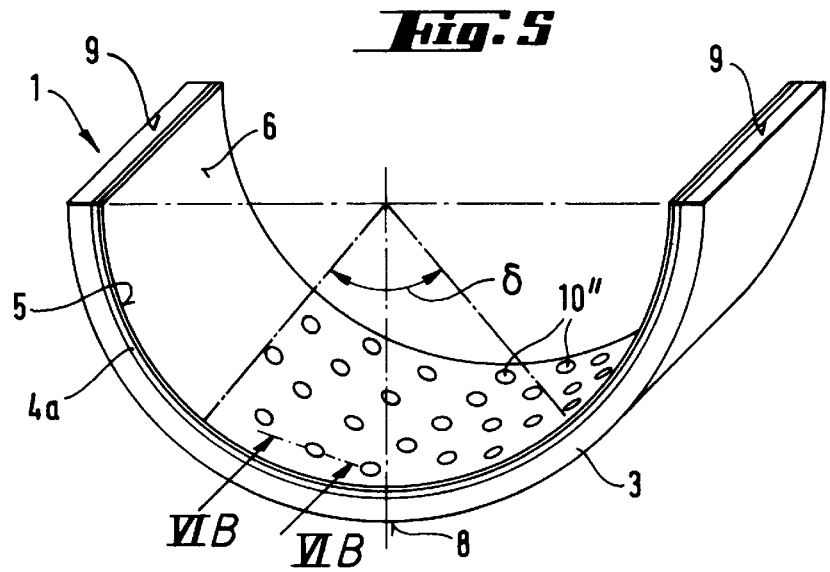
FIG. 5 is a perspective representation of a plain bearing half-liner according to a further embodiment.

In FIG. 5 is shown a further embodiment of a plain bearing half-liner 1 in which the oil pockets 10" are provided only in a region of circumferential angle δ=±45° in the region of the crown area 8. This is the region of the greatest loading of the bearing or the smallest thickness of the lubrication film. The design of the plain bearing half-liner 1 in FIG. 5 differs from that in FIG. 1 in that first a lead bronze 4a is deposited on the steel backing 3 and the former is fully coated with an electroplated layer 5 or a sputtered layer.

Figure 6A:
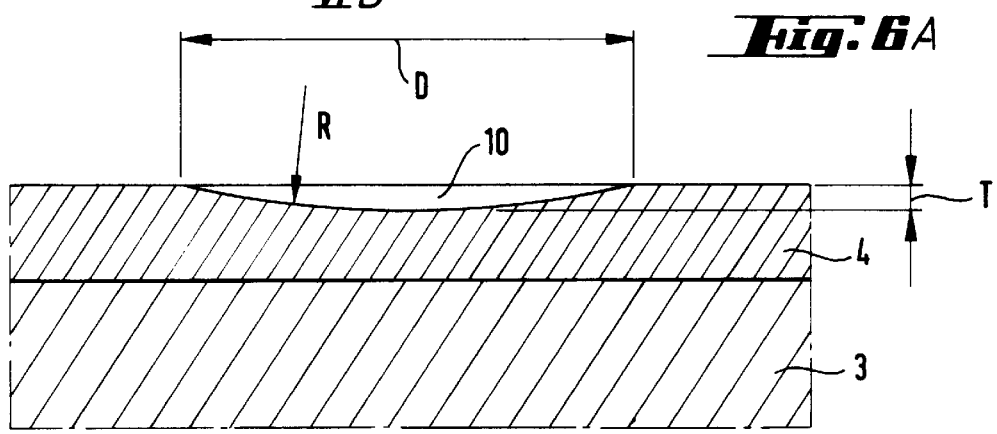
FIG. 6A is a section along line VIa—VIa in the plain bearing half-liner shown in FIG. 1.

FIG. 6A shows, in a section VIa—VIa through the plain bearing half-liner 1 according to FIG. 1, oil pockets 10 in the shape of a spherical segment.

Figure 6B:
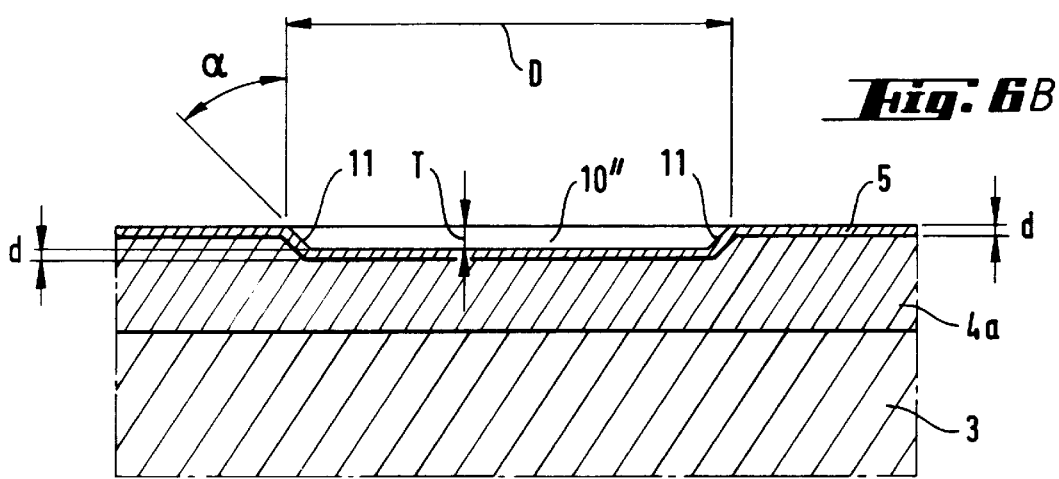
FIG. 6B is a section along line VIb—VIb in the plain bearing half-liner shown in FIG. 5, FIGS. 7A,B are top views of the developed sliding surface of the plain bearing half-liner shown in FIG. 1 for two different embodiments.

FIG. 6B shows, in a section VIb—VIb through the plain bearing half-liner 1 according to FIG. 5, frustoconical oil pockets 10" whose sidewalls 11 make with the perpendicular an angle α of about 45°. The oil pockets 10" are embossed in the lead bronze 4a and the electroplated layer 5 has everywhere the same thickness d, even in the region of the oil pockets. The oil pockets 10" are therefore fully lined but have the same depth as they had before electroplating, while the thickness d of the electroplated layer 5 is smaller than the depth T of the oil pockets 10" embossed in the lead bronze 4a which, however, need not be so in principle. It must be ensured that the oil pockets are, as before, open to admit lubricating oil.

FIG. 7A is the top view of a developed sliding surface 6 of the plain bearing half- liner 1 shown in FIG. 1. The oil pockets 10 are arranged one after another in longitudinal lines 15, and the longitudinal lines 15 make with the circumferential direction 17 an angle β which is about 30°. The oil pockets are also arranged in transverse lines 16 which make with the axial direction 18 an angle γ of 15°. This angular arrangement ensures that the spacing of the oil pockets in the circumferential direction 17 is at least 12 mm.

FIG. 7B shows, in a manner similar to FIG. 7A, the development of a sliding surface 6 with oil pockets 10''' which are rhombus-shaped in top view.

FIG. 8 shows in perspective representation a flanged bearing 19. As is apparent, also the flanges 20 are provided with lubricating oil pockets 21 and the arrangement and shape of the oil pockets 21 is comparable to the earlier described oil pockets.

Figure 9:
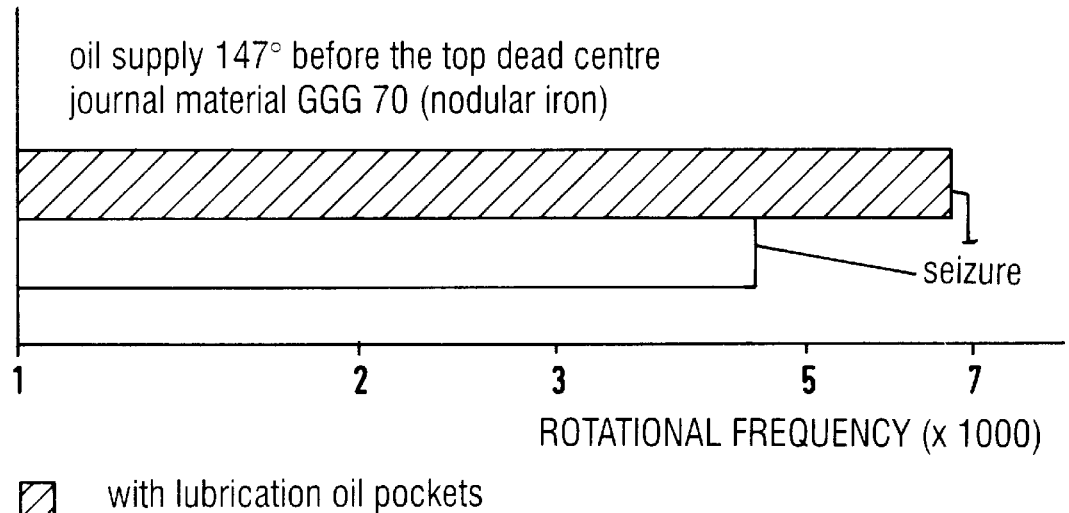
FIG. 9 is a diagram in which are plotted rotational frequencies in the case of inadequate lubrication.
Figure 10:
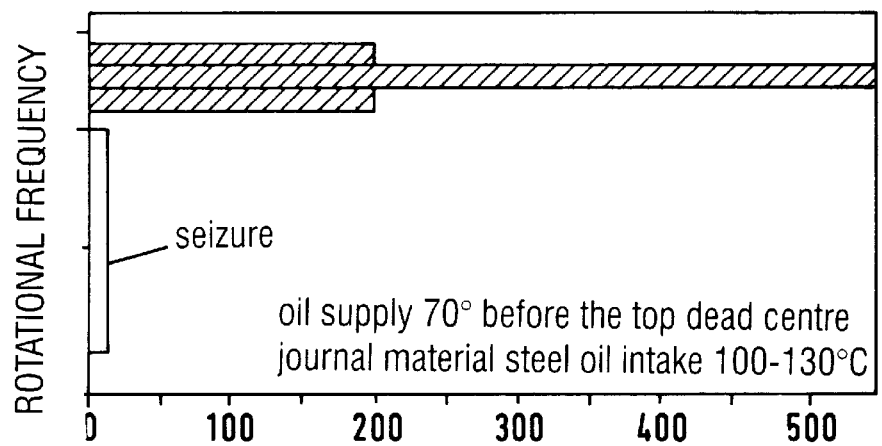
FIG. 10 is a diagram for sliding performance.

FIGS. 9 and 10 show comparative tests.

In FIG. 9 is plotted the maximum rotational frequency which in the case of inadequate lubrication reaches seizure in the case of plain bearings both with and without oil pockets. Tested were bearing liners of steel with a bearing alloy of lead bronze with an electroplated layer. The bearing liner with oil pockets had the following specification:

Pocket depth: 0.08 mm

Ratio of pocket area to pocket depth: 22 mm

Total area of all oil pockets: 45 mm$^2$≈3% of the total sliding surface

β: 21°

γ: 10°

In this test the oil pockets were uniformly distributed on the whole sliding surface and all the oil pockets have the same depth T. The viscosity of the lubricating oil was η=3 mPas.

The diagram in FIG. 9 shows that, in the case of inadequate lubrication, a bearing according to the invention can rotate at a much higher rotational frequency before seizure occurs.

In the bar diagram in FIG. 10 is shown the sliding performance of bearing liners of steel with an overlay of an aluminium alloy based on 15 tests with plain bearing liners without oil pockets. In all bearing liners seizure occurred at the most after 10 h. Also 10 tests with plain bearing liners of the same alloy but with oil pockets were made at an increased rotational frequency, of which nine tests lasted for 200 h and one test for over 500 h. All tests were stopped on reaching the test time without damage. The shape of the oil pockets was the same as in the test according to FIG. 9.

Obviously, many modifications and variations of the present invention are possible in the light of the above teachings. It is, therefore, to be understood that within the scope of the appended claims, wherein reference numerals are for convenience and not to be considered in any way limiting, the invention may be practiced otherwise than as specifically described.

What is claimed is:

1. A plain bearing comprising:
    a metallic backing;
    a metallic bearing layer of bearing metal applied to said backing; and
    a plurality of lubricating oil-retaining pockets provided in said bearing layer having depths of about 0.03 mm to 0.3 mm and ratios of pocket area to pocket depth of about 10 to 40 mm.

2. The plain bearing of claim 1 including a sliding surface of predetermined area and wherein said pockets have a combined area ≦10% of said sliding surface area.

3. The plain bearing of claim 1 wherein said pockets have varying depths.

4. The plain bearing of claim 3 wherein said pockets have the greatest depth in regions corresponding to highest loading or least thickness of the lubricating oil and continuously decrease in depth toward regions corresponding to lowest loading or greatest thickness of the lubricating oil.

5. The plain bearing of claim 3 wherein said pockets have the greatest depth in regions corresponding to lowest loading and continuously decrease in depth toward regions corresponding to highest loading.

6. The plain bearing of claim 1 wherein said pockets comprises embossed indentations extending into said bearing layer.

7. The plain bearing of claim 1 wherein said bearing metal comprises an aluminum alloy.

8. The plain bearing of claim 1 including a covering layer applied to said sliding surface and said pockets.

9. The plain bearing of claim 8 wherein said covering layer is selected from a group consisting essentially of an electroplated layer and a sputtered layer.

10. The plain bearing of claim 8 wherein said covering layer has a predetermined thickness relatively less than said depth of said pockets.

11. The plain bearing of claim 8 wherein said covering layer has a predetermined thickness relatively greater than said depth of said pockets and applied uniformly across said pockets so as to retain the presence of said pockets in said covering layer.

12. The plain bearing of claim 1 wherein said pockets have a predetermined shape.

13. The plain bearing of claim 12 wherein said predetermined shape comprises a spherical segment.

14. The plain bearing of claim 12 wherein said pockets are frustoconical in shape.

15. The plain bearing of claim 14 wherein said frustoconical pockets have a predetermined side-wall angle in the range of about 30° to 60°.

16. The plain bearing of claim 12 wherein said predetermined shape of said pockets comprises a rhombus when viewed in plan.

17. The plain bearing of claim 1 wherein said pockets are arranged in succession in longitudinally extending lines making an angle β of about 15 to 40° with respect to a circumferential direction of said bearing.

18. The plain bearing of claim 17 wherein said pockets are further arranged in transversely extending lines making an angle γ with an axial direction of said bearing.

19. The plain bearing of claim 1 wherein said pockets are arranged in a grid pattern extending in succession along longitudinal and transverse lines and spaced from one another in a direction of sliding by a distance of at least 12 mm.

20. The plain bearing of claim 1 including a crown area of said bearing extending across a circumferential angle of about ±30° to 60° and wherein said pockets are provided in said crown area only.

21. The plain bearing of claim 1 wherein said bearing comprises a main bearing of an internal combustion engine.

22. The plain bearing of claim 1 wherein said bearing comprises a big end bearing of an internal combustion engine.

23. In an internal combustion engine including at least one plain bearing selected from the group consisting essentially of main bearings and big end bearings having a construction, comprising:
    a metallic backing;
    a metallic bearing layer of bearing metal applied to said backing; and
    a plurality of lubricating oil-retaining pockets provided in said bearing layer having depths of about 0.03 mm to 0.3 mm and ratios of pocket area to pocket depth of about 10 to 40 mm.

* * * * *